Dec. 5, 1967   B. I. KJELLBERG   3,356,832
FLUID EXPANSION THERMOSTAT SYSTEM
Filed Jan. 12, 1965
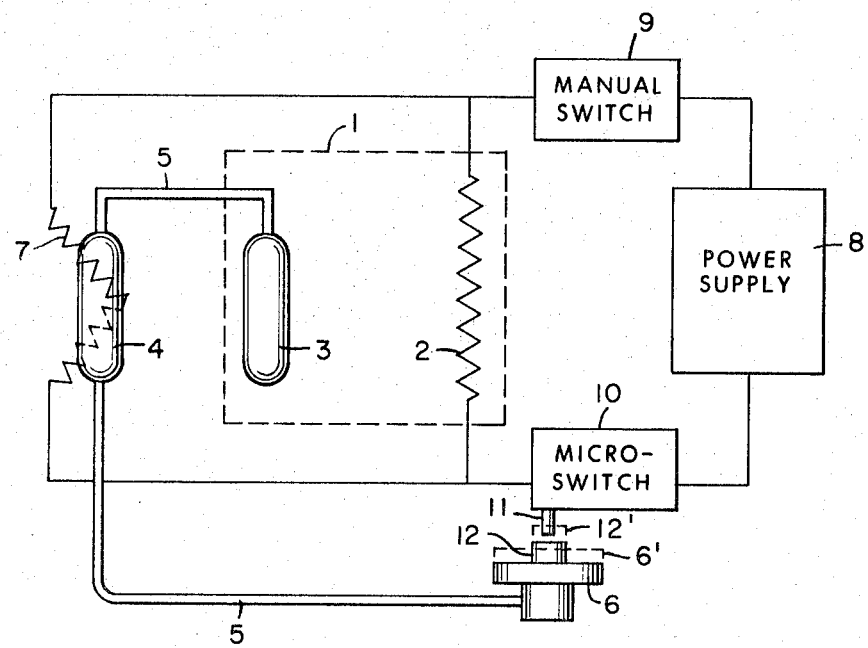
INVENTOR
BURRE I. KJELLBERG
BY
ATTORNEY

United States Patent Office 3,356,832
Patented Dec. 5, 1967

3,356,832
FLUID EXPANSION THERMOSTAT SYSTEM
Burre I. Kjellberg, Ballwin, Mo., assignor to Diatemp, Inc., St. Louis, Mo., a corporation of Missouri
Filed Jan. 12, 1965, Ser. No. 424,971
2 Claims. (Cl. 219—413)

ABSTRACT OF THE DISCLOSURE

A hydraulic temperature control for an oven chamber in which one hydraulic bulb senses the temperature of the heating element inside the oven chamber, and a second hydraulic bulb is located outside the chamber in contact with a small heating element so that second bulb acts as a booster bulb in actuating the on-off control of power to both heating elements to narrow the differential of the the temperature control.

My invention consists of a new element for and a new combination in fluid-filled thermostats.

The principal object of my invention is to reduce the "differential" or "amplitude" for a fluid-filled thermostat. One direct critique of a thermostat system is the number of degrees of temperature range is the minimum sufficient to cycle the thermostat operation, that is to turn it on and then turn it off. This range of degrees of temperature is called the "differential" or "amplitude." Fluid-filled thermostats are notoriously bad in this connection. The typical system in use at the time of this writing has a "differential" of seventy to eighty degrees Fahrenheit, with many as high as one hundred degrees Fahrenheit. With my invention the "differential" is lowered to a range of twenty-five to thirty-five degrees Fahrenheit.

A related object of my invention is to improve the responsiveness of such temperature-measuring systems. A typical application is in household ovens. When the temperature in the oven reaches a preset level, the thermostat system acts to turn off the power supply. There is a significant time lag however between the time at which the temperature level is reached and the time at which the thermostat responds. With my invention, this time lag is greatly lessened.

Other objects and advantages will become apparent from the following description taken in connection with the accompanying drawing which is a schematic view of the invention.

Numeral 1 is given to the oven chamber of a typical application; the oven chamber is indicated by that area delineated by the dotted line box at the center of the drawing. Inside the oven chamber 1 is the oven heating element 2, which is the typical large, electrical resistance heating element used in electrical ovens at the present time. Also inside the oven chamber, but shielded from the direct heat of the heating element 2, is the bulb 3 which contains an expansion fluid, common in the art. Bulb 3 is generally placed on the wall of the oven chamber in present practice.

In series with bulb 3 I place a second bulb 4, which I call the "booster" bulb. The booster bulb 4 is connected to the temperature-sensing bulb 3 by the conventional capillary tubing 5.

Also in series with temperature-sensing bulb 3 is the expansible and contractible diaphragm power element 6. The diaphragm power element 6 is similarly connected to the booster bulb 4 by another conventional section of capillary tubing 5.

The diaphragm power element is conventional in the art as shown by the element 32 of United States Patent No. 2,307,636, issued Jan. 5, 1943, to Newell. Again the diaphragm element is also shown as element 32 in the United States Patent No. 2,607,533, issued Aug. 19, 1952, to Main. It must be recognized however that any expansible and contractible power element will work in the position indicated by the diaphragm 6 of my drawing. I could substitute there the expansible bellows 4 shown in United States Patent No. 2,201,375, issued May 21, 1940, to Newell.

Referring again to my drawing, in parallel with the oven heating element 2 is the booster heating element 7. I locate that in intimate contact with the booster bulb 4. In fact I prefer to make it in the form of a resistance wire and to wind it around the booster bulb as illustrated in the drawing.

The power supply is illustrated by a block diagram, at 8. It would be for the application depicted a two hundred and twenty volt power line pair, as in the conventional oven. The numeral 9 is given to the manual switch which is the ordinary oven on-off control, having a temperature setting. The numeral 10 is given to the microswitch which is provided with a switch lever at 11. The switch lever 11 is for contact with the stud 12 on the diaphragm power element 6.

In operation the operator turns the manual switch 9 of the oven on, actuating the heating cycle. The microswitch 10 is in the on position, with the switch lever 11 extended and not touching the stud 12 on the power element 6, since the power element 6 is contracted to its full line position.

With the manual switch on and the microswitch 10 on, power will flow to the two heating elements, the oven heating element 2 and the booster bulb heating element 7. The fluid which is inside the two bulbs 3 and 4, which are in series, will flow through the two capillary tubings 5 and fill the diaphragm power element 6.

The power element 6 will expand to its dotted line position 6', moving the stud 12 to the dotted line position 12', and actuating the microswitch 10 to cut the power from the power supply 8 to the two resistance heating elements 2 and 7, when a given preset temperature T' is reached.

At this point the resistance heating elements will begin to cool, since there is no power flowing to them. The fluid in the bulbs 3 and 4 will cool and contract, allowing the fluid in the diaphragm power element 6 to contract. Thus the diaphragm will return to its full line position 6, from its dotted line expanded position 6', and the stud on the diaphragm will return to its full line position 12 at which it does not touch the switch lever 11, and thus the lever will be moved outward. In this condition the microswitch will go to the on condition and power will again flow to the two resistance heating elements 2 and 7 and the cycle will begin again.

Ordinarily the limits between which the on and off conditions of a single bulb thermostat arrangement will cycle, are of the order of seventy to eighty degrees Fahrenheit. In a typical case the total travel of the stud 12 when the diaphragm is expanding from 6 to 6', will be of the order of three thousandths of an inch.

With my invention I locate the bulb 4 near the diaphragm 6. A sharing of the expansion characteristics is given by the booster bulb 4 and its associated heater element 7. The result is that only twenty-five degrees Fahrenheit will be required to initiate the cycling of my thermostat system as compared with the approximately seventy-five degrees Fahrenheit of the previous one bulb system, the so-called "differential."

A striking new result is obtained however. It is that the narrowing of the "differential" is not what would be expected, that is that clipping of the temperature range would be somewhat equal, and that if fifty degrees Fahrenheit were to be removed, that is seventy-five degrees minus twenty-five degrees, it would be removed approximately equally above and below on the cycling pattern, in the typical case.

The fifty degrees is removed from the upper part of the cycle, that is the portion at which the thermostat system turns off the heat supply to the oven. The system turns on at the same initial point, but turns off the power supply almost fifty degrees lower. This is completely unexpected and a surprise to those thermostat engineers who have studied the graphs made by the prototypes.

It will be obvious to those familiar with the art of fluid-filled thermostat systems that various modifications, variations and changes could be made without departing from the spirit of the invention, such as substituting a bellows for the bulb of the temperature-sensing means 3, or even substituting a bellows for the bulb 4. Again the choice of relative dimensions of the two bulbs 3 and 4 may be varied, as well as their relative location with respect to the power element 6, all being well within the knowledge and capability of those skilled in the art.

Having described my invention, what I wish to claim is:

1. In a thermostat system for an oven chamber of the type described, a power supply, a microswitch in series connection and controlling the flow of power from said power supply, a first heating element connected in parallel with said power supply, a temperature-sensing bulb in said oven chamber filled with expansible fluid to sense the heat output of said first heating element in said oven chamber, a booster bulb located outside said oven chamber and connected hydraulically in series with said first bulb and similarly filled with expansible fluid, an expansible diaphragm power element outside oven chamber and connected in series with both of said bulbs and expansible to actuate said microswitch, and a second heating element wound around said booster bulb and connected in parallel with said power supply.

2. The combination described in claim 1, and further characterized by the first of said heating elements being the principal source of heat in said system, the other heating element being in intimate contact with said second bulb, and a manual switch being located in series between said heating elements and said power supply.

References Cited

UNITED STATES PATENTS

| 2,428,642 | 10/1947 | Weeks | 219—513 X |
| 2,611,850 | 9/1952 | Walton | 219—511 |

FOREIGN PATENTS 1,114,872  3/1956  France.

RICHARD M. WOOD, *Primary Examiner.*

L. H. BENDER, *Assistant Examiner.*